United States Patent
Kohanek et al.

(10) Patent No.: US 12,322,282 B2
(45) Date of Patent: *Jun. 3, 2025

(54) SYSTEM AND METHOD FOR RAPID CONFIGURATION OF A UNIVERSAL CONTROLLING DEVICE

(71) Applicant: Universal Electronics Inc., Scottsdale, AZ (US)

(72) Inventors: Jeffrey Kohanek, Huntington Beach, CA (US); Jeremy K. Black, N. Tustin, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,785

(22) Filed: Jul. 13, 2023

(65) Prior Publication Data

US 2023/0360518 A1    Nov. 9, 2023

Related U.S. Application Data (63) Continuation of application No. 17/704,255, filed on Mar. 25, 2022, now Pat. No. 11,735,032, which is a continuation of application No. 15/927,587, filed on Mar. 21, 2018, now Pat. No. 11,335,184, which is a continuation of application No. 13/895,992, filed on May 16, 2013, now Pat. No. 9,953,519, which is a
(Continued)

(51) Int. Cl.
*G08B 21/00* (2006.01)
*G08C 17/02* (2006.01)
*G08C 19/28* (2006.01)
*H04N 21/422* (2011.01)
*H04N 21/4367* (2011.01)

(52) U.S. Cl.
CPC .............. *G08C 17/02* (2013.01); *G08C 19/28* (2013.01); *H04N 21/42204* (2013.01); *H04N 21/42225* (2013.01); *H04N 21/42227* (2013.01); *H04N 21/4367* (2013.01); *G08C 2201/92* (2013.01); *H04N 21/42226* (2013.01)

(58) Field of Classification Search
CPC .... G08C 17/02; G08C 19/28; G08C 2201/92; H04N 21/42204; H04N 21/42225; H04N 21/42227; H04N 21/4367; H04N 21/42226
USPC ....................................................... 340/12.5
See application file for complete search history.

(56) References Cited

U.S. PATENT DOCUMENTS

| | | |
|---|---|---|
| 4,623,887 A | 11/1986 | Welles, II |
| 4,774,511 A | 9/1988 | Rumbolt et al. |
| 4,959,810 A | 9/1990 | Darbee et al. |

(Continued)

FOREIGN PATENT DOCUMENTS

| | | |
|---|---|---|
| WO | 2005043484 | 5/2005 |
| WO | 2007105142 | 9/2007 |

OTHER PUBLICATIONS

European Patent Office, Supplementary Partial European Search Report of EP Patent Appln. No. 09826948.3, Search completed Jun. 25, 2012, 8 pgs.

(Continued)

*Primary Examiner* — Mark S Rushing
(74) *Attorney, Agent, or Firm* — Greenberg Traurig, LLP (57) ABSTRACT

A universal controlling device is provided with one or more buttons which, when activated in a set up mode, serves to initiate a rapid configuration of the universal controlling device to adapt the universal controlling device to transmit communications to an intended target appliance.

24 Claims, 8 Drawing Sheets

Related U.S. Application Data continuation-in-part of application No. 12/272,309, filed on Nov. 17, 2008, now Pat. No. 9,398,242.

(56) References Cited

U.S. PATENT DOCUMENTS

| | | |
|---|---|---|
| 5,383,044 A | 1/1995 | Borchardt et al. |
| 5,451,953 A | 9/1995 | Duffield |
| 5,515,052 A | 5/1996 | Darbee |
| 5,614,906 A | 3/1997 | Hayes et al. |
| 5,712,638 A | 1/1998 | Issa |
| 6,008,735 A | 12/1999 | Chiloyan et al. |
| 6,058,106 A | 5/2000 | Cudak et al. |
| 6,157,319 A | 12/2000 | Johns et al. |
| 6,195,033 B1 | 2/2001 | Darbee et al. |
| 6,225,938 B1 | 5/2001 | Hayes et al. |
| 6,507,306 B1 | 1/2003 | Griesau et al. |
| 6,803,874 B1 | 10/2004 | Weber |
| 6,938,101 B2 | 8/2005 | Hayes et al. |
| 7,218,243 B2 | 5/2007 | Hayes et al. |
| 7,548,246 B2 | 6/2009 | Huang et al. |
| 7,586,398 B2 | 9/2009 | Huang et al. |
| 8,402,501 B2 | 3/2013 | Guzman et al. |
| 8,896,426 B1 | 11/2014 | Mui |
| 2001/0017615 A1 | 8/2001 | Lin et al. |
| 2003/0020638 A1 | 1/2003 | Sari et al. |
| 2003/0103088 A1 | 6/2003 | Dresti et al. |
| 2004/0174288 A1 | 9/2004 | Park |
| 2005/0149971 A1 | 7/2005 | Hallberg |
| 2005/0151726 A1 | 7/2005 | Wouters |
| 2006/0109138 A1 | 5/2006 | Chiang |
| 2006/0217065 A1 | 9/2006 | Spilo et al. |
| 2007/0052547 A1 | 3/2007 | Haughawout et al. |
| 2007/0146193 A1 | 6/2007 | Sato et al. |
| 2007/0225828 A1 | 9/2007 | Huang et al. |
| 2008/0003993 A1 | 1/2008 | Rye et al. |
| 2008/0129579 A1 | 6/2008 | Griesau et al. |
| 2009/0237287 A1 | 9/2009 | D'Hoore et al. |
| 2009/0292375 A1 | 11/2009 | Thompson et al. |
| 2010/0123613 A1 | 5/2010 | Kohanek et al. |
| 2011/0250914 A1 | 10/2011 | Arlotta |
| 2013/0069769 A1 | 3/2013 | Pennington et al. |

OTHER PUBLICATIONS

Universal Electronics, ATLAS OCAP 5-Device, Remote Control, 88 pgs., Revision 3.0.

ISA/US, International Search Report and Written Opinion issued on PCT Application No. US14/038138, dated Oct. 8, 2014, 9 pages.

European Patent Office, extended European Search Report issued of EP patent application No. 18168389.7, 8 pages.

CNIPA, Office Action issued on Chinese patent application No. 201480034569.8, 4 pages.

Brazilian Patent Office, Office Action issued on Brazilian patent application No. BR112015028689.5, dated Jun. 9, 2020, 2 pages.

WIPO, International Preliminary Report on Patentability of PCT Appln. No. US09/64710, May 17, 2011, 7 pgs.

SYSTEM AND METHOD FOR RAPID CONFIGURATION OF A UNIVERSAL CONTROLLING DEVICE

RELATED APPLICATION INFORMATION

This application claims the benefit of and is a continuation of U.S. application Ser. No. 17/704,255, filed on Mar. 25, 2022, which application claims the benefit of and is a continuation of U.S. application Ser. No. 15/927,587, filed on Mar. 21, 2018, which application claims the benefit of and is a continuation of U.S. application Ser. No. 13/895,992, filed on May 16, 2013, which application claims the benefit of and is a continuation-in-part of U.S. application Ser. No. 12/272,309, filed on Nov. 17, 2008, the disclosures of which are incorporated herein by reference in their entirety.

BACKGROUND

Universal controlling devices, for example, remote controls, which are adaptable to issue commands to a multiplicity of appliances of different manufacture and/or type, and the features and functionality provided by such controlling devices are well known in the art. In this regard, early universal controlling devices such as described in U.S. Pat. No. 4,623,887 were generally "learners," that is, they were adapted to capture, store, and subsequently play back the command signals of the original equipment remote controls corresponding to the appliances to be controlled. However, the required initial teaching process used to configure such early universal controlling devices proved tedious and error prone.

To address this drawback, further universal controlling devices were introduced which included preprogrammed libraries of command data, such as those described in U.S. Pat. No. 4,774,511 or 4,959,810. As particularly described in U.S. Pat. No. 4,959,810, to configure such a universal controlling device a user is required to consult a reference manual or the like to obtain a setup code that corresponds to an intended target appliance. The setup code is then keyed into the universal controlling device where it is used to select a command data set from the library of command data sets stored in the universal controlling device whereupon the selected command data set is to be used when the universal controlling device is instructed to issue commands to that intended target appliance. U.S. Pat. Nos. 5,451,953 and 5,614,906 further illustrate and describe methods for configuring a controlling device using a library of command data sets stored in memory of the controlling device.

As alternatives to a user looking up a setup code and manually keying the setup code into the universal controlling device for the purpose of configuring the universal controlling device, U.S. patent application Ser. No. 10/665,642 and U.S. Pat. Nos. 7,218,243, 6,225,398 and 6,157,319 illustrate and describe using information from, for example, an RFID tag, bar code, appliance generated signal, user interaction with a locally displayed or remotely (e.g., computer or Internet) accessible menu, etc. to identify the appliance intended to be controlled which information is accordingly used to select a command data set from a library of command data sets to be used when sending commands to that appliance. As further described in these references, the library of command data sets may be stored locally on the universal controlling device or in a database accessible to the universal controlling device where the selected command data sets are thus downloaded into the universal controlling device, or a combination thereof.

Still further, universal controlling devices are known that allow a user to key into the universal controlling device information that is used to configure the universal controlling device to command additional operations of an intended target appliance. One such universal controlling device is described and illustrated in U.S. Pat. No. 5,515,052. A yet further system and method for configuring a universal controlling device to command operations of an intended target appliance is described and illustrated in co-pending U.S. application Ser. No. 11/389,627, entitled "System And Method For Defining A Controlled Device Command Set."

It is also known in the art to configure a universal controlling device to thereby provide to the universal controlling device a user interface that has the same appearance as the original equipment remote control corresponding to the appliances to be controlled. For example, U.S. Pat. No. 6,938,101 illustrates and describes a universal controlling device that provides a user interface in the form of a virtual remote control that has the key layout and appearance of an original equipment remote control. Similarly, PCT Published Application WO 2005/043484 illustrates and describes a universal controlling device having a camera where the camera is used to capture an image of an original equipment remote control which captured image is then used in the user interface of the universal controlling device.

While these variously known systems and methods for configuring a universal controlling device generally work for their intended purpose, a need remains for a system and method that provides a yet more convenient and user friendly way for configuring a universal controlling device.

SUMMARY OF THE INVENTION

In accordance with this and other needs, the following generally describes a system and method for rapid configuration of a universal controlling device. To this end, in addition to one or more of the previously described configuration methods, a universal controlling device may be provided with one or more buttons which, when activated in a set up mode, may serve to initiate a rapid configuration of the controlling device to utilize one of a group of pre-selected command data sets. Such pre-selected command data sets may comprise a subset of the complete library of command data sets available within the controlling device, and may represent, for example, those command data sets most likely to be required for a particular application of the controlling device. The exact subset to be offered may be preset at time of shipment, deployment, or manufacture based upon, for example, the purchasing entity or geographic region to which the controlling device is to be shipped; a brand or type of equipment with which it is intended to be packaged; the environment in which it is destined to be used; etc.

In this manner a single universal controlling device with a comprehensive library of command data sets may nevertheless be adapted to be rapidly configurable via the use of abbreviated keystroke sequences which correspond to a substantial proportion of the target controlled appliance population in an intended field of application.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
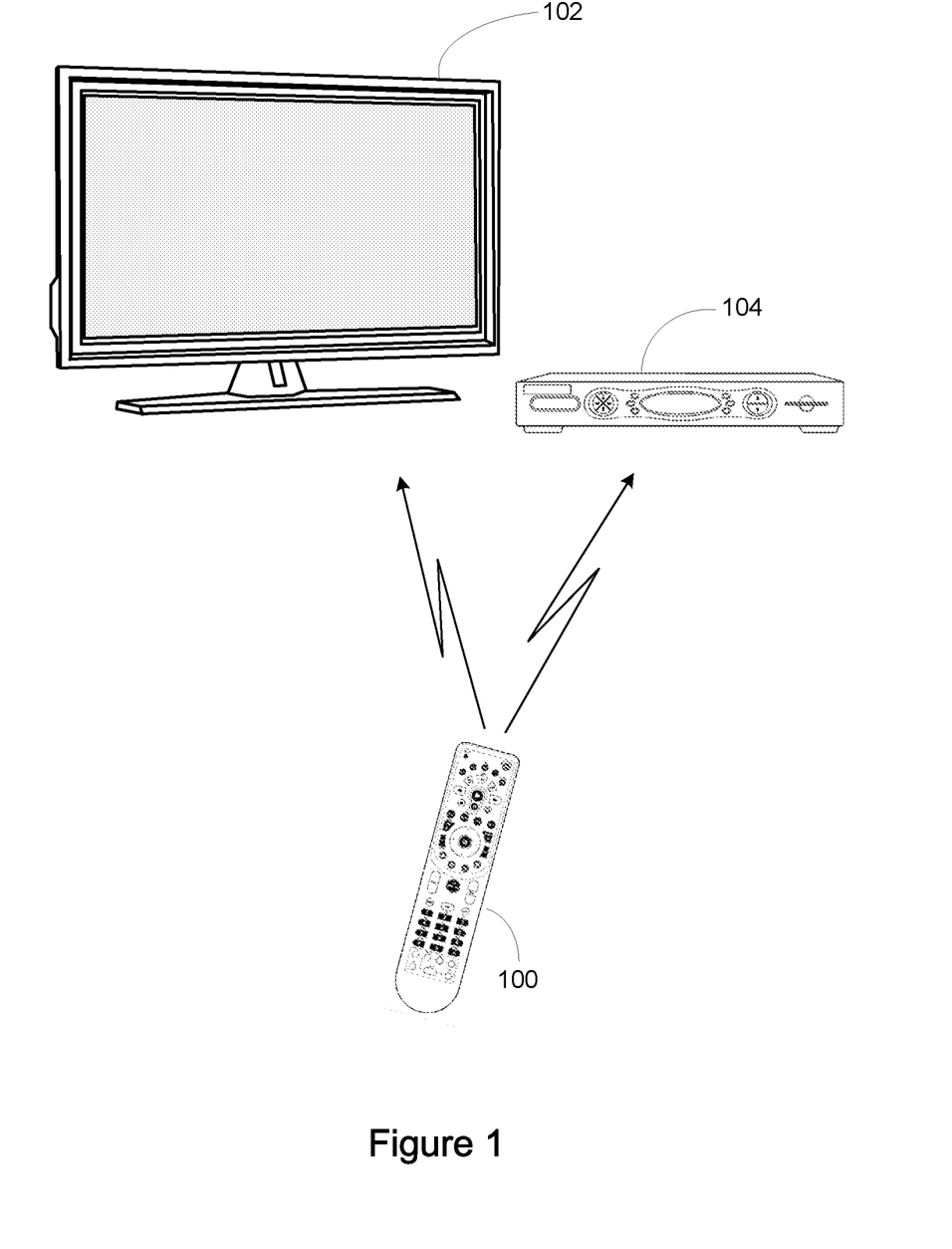
FIG. 1 illustrates an exemplary system in which an exemplary controlling device according to the instant invention may be used.

Turning now to FIG. 1, there is illustrated an exemplary system in which a controlling device 100 is configured to control various controllable appliances, such as a television 102 and a set top box ("STB") 104. As is known in the art, the controlling device 100 is capable of transmitting commands to the appliances, using any convenient IR, RF, Point-to-Point, or networked protocol, to cause the appliances to perform operational functions. While illustrated in the context of a television 102 and STB 104, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 2:
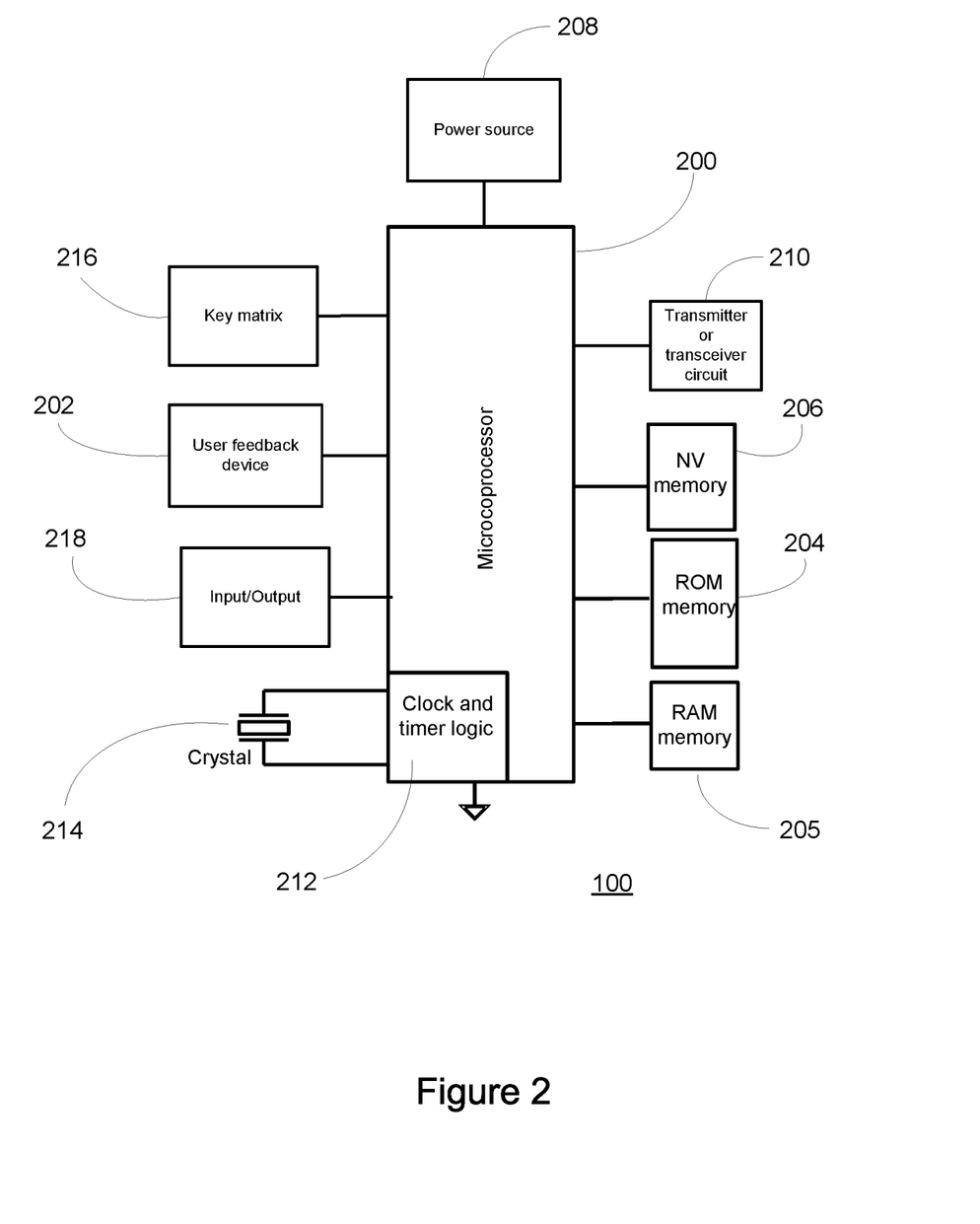
FIG. 2 illustrates a block diagram of exemplary components of the exemplary controlling device of FIG. 1.

With reference to FIG. 2, for use in commanding the functional operations of one or more appliances, the controlling device 100 may include, as needed for a particular application, a processor 200 coupled to a ROM memory 204, a RAM memory 205, a key matrix 216 (e.g., hard keys, soft keys such as a touch sensitive surface overlaid on a liquid crystal (LCD), and/or an electroluminescent (EL) display), transmission circuit(s) and/or transceiver circuit(s) 210 (e.g., IR and/or RF), a non-volatile read/write memory 206, a means 202 to provide feedback to the user (e.g., one or more LEDs, display, speaker, and/or the like), a power source 208, an input/output port 218 such as a serial interface, USB port, modem, Zigbee, WiFi, or Bluetooth transceiver, etc., and clock and timer logic 212 with associated crystal or resonator 214.

Figure 3:
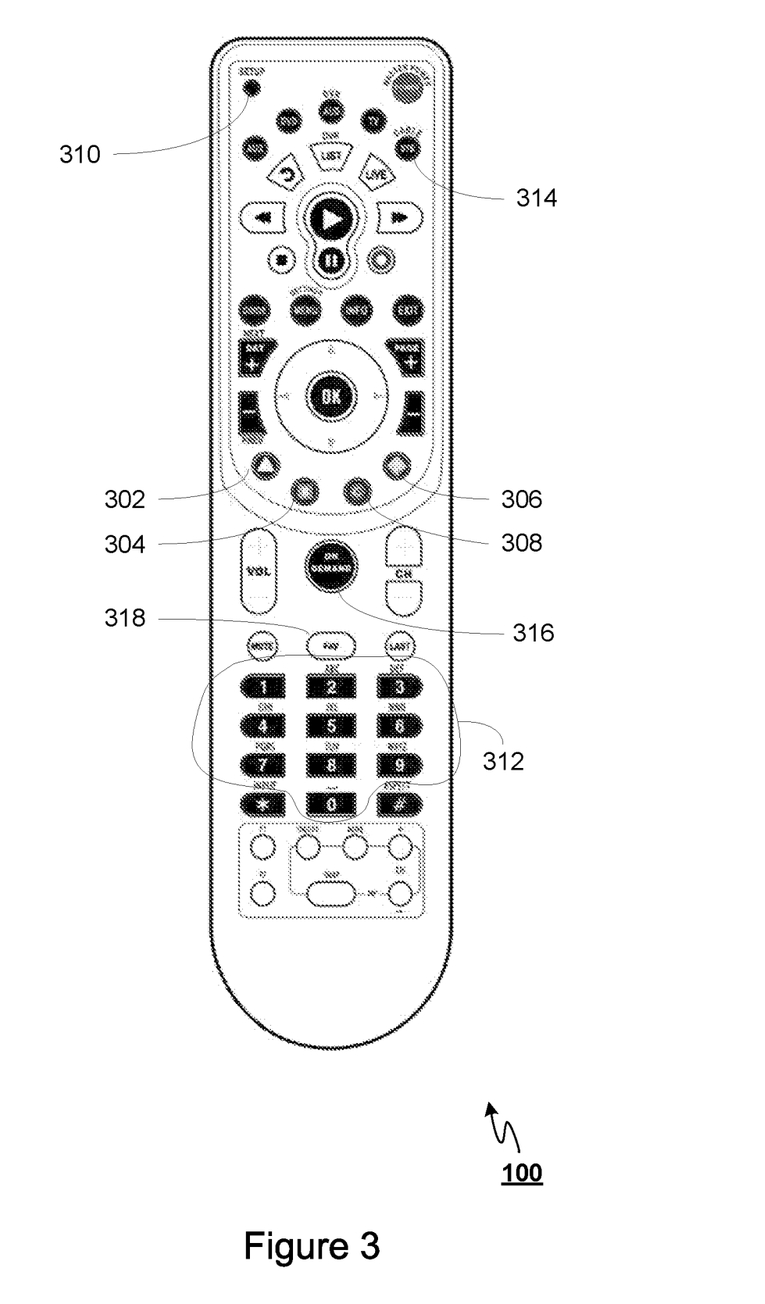
FIG. 3 further illustrates the exemplary controlling device of FIG. 1.

As will be understood by those skilled in the art, some or all of the memories 204, 205, 206 may include executable instructions (collectively, the program memory) that are intended to be executed by the processor 200 to control the operation of the remote control 100, as well as data which serves to define to the operational software the necessary control protocols and command values for use in transmitting command signals to controllable appliances (collectively, the command data). In this manner, the processor 200 may be programmed to control the various electronic components within the remote control 100, e.g., to monitor the power supply 208, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 205 are non-volatile or battery-backed such that data is not required to be reloaded after battery changes. In addition, the memories 204, 205 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 3 only for the sake of clarity.

To cause the controlling device 100 to perform an action, the controlling device 100 is adapted to be responsive to events, such as a sensed user interaction with the key matrix 216, etc. In response to an event, appropriate instructions within the program memory (hereafter the "operating program") may be executed. For example, when a function key is actuated on the controlling device 100, the controlling device 100 may retrieve from the command data stored in memory 204, 205, 206 a command value and control protocol corresponding to the actuated function key and, where necessary, current device mode and transmit that command to an intended target appliance, e.g., STB 104, in a format recognizable by that appliance to thereby control one or more functional operations of that appliance. It will be appreciated that the operating program can be used not only to cause the transmission of commands/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

For selecting sets of command data to be associated with the appliances to be controlled (hereafter referred to as a setup procedure), data may be entered into the controlling device 100 that serves to identify each intended target appliance by its make, and/or model, and/or type. The data is typically entered via activation of those keys that are also used to cause the transmission of commands to an appliance, preferably the keys that are labeled with numerals. Such data allows the controlling device 100 to identify the appropriate command data set within a preprogrammed library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In conventional practice as is well known in the art, such data used to identify an appropriate command data set may take the form of a numeric setup code (obtained, for example, from a printed list of manufacturer names and/or models with corresponding code numbers, from a support Web site, etc.). Alternative setup procedures previously proposed in the art include scanning bar codes, sequentially transmitting a predetermined command in different formats until a target appliance response is detected, interaction with a Web site culminating in downloading of command data and/or setup codes to the controlling device, etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959, 810, 5,614,906, or 6,225,938 all of like assignee and incorporated herein by reference in their entirety.

To facilitate rapid setup of a select subset of available target appliances controlling device 100 may, in accordance with the instant invention and in addition to one or more of the previously known setup procedures described above, be adapted to support an abbreviated keypress sequence which will immediately configure the controlling device for use with one of a group of preselected device command data sets, as will now be described in further detail.

In an exemplary embodiment, universal controlling device 100 is intended for deployment by a cable system operator in conjunction with a cable STB (e.g., 104). Since a particular cable system operator typically utilizes only a small number of different STB models in the field, even though controlling device 100 may include a large library of STB command data sets only a few of the command data sets may be applicable within a given cable system. Accordingly, the operating software of controlling device 100 of FIG. 3 may be adapted to implement a method whereby, for example, any one of the four keys 302, 304, 306 and 308, when activated in conjunction with Setup key 310, may serve as a quick link to a predetermined numeric setup code value. These predetermined numeric setup code values may reside in a programmable area of memory (e.g. NV memory 206) and may for example be configured, i.e., mapped to the quick set keys, at a factory or distribution center prior to shipment to a cable system operator to match the STB equipment known to be deployed by the cable system operator for which the controlling device 100 is destined, or alternatively may be configured at a multiple cable system operator's central warehouse or distribution center to match the STB equipment known to be deployed in a particular region prior to onward shipment of controlling device 100 to that region (individually and collectively referred to hereinafter as "prior to deployment"). Such configuration may be performed, for example, by loading data via input/output port 218, by reception of data via transceiver 210, by entry of keystroke sequences on key matrix 216, etc. Combinations of such methods may also be used, for example the memory contents of a master unit may initially be configured using keystroke sequences, after which its memory contents may be read out through input/output port 218 and subsequently duplicated into other controlling devices by downloading through their input/output ports. In this regard, methods for configuration of controlling device programmable memory are well known in the art, for example as described in U.S. Pat. No. 5,953,144 or 6,223,348 both of like assignee and incorporated herein by reference in their entirety, and will accordingly not be further described herein.

Figure 4:
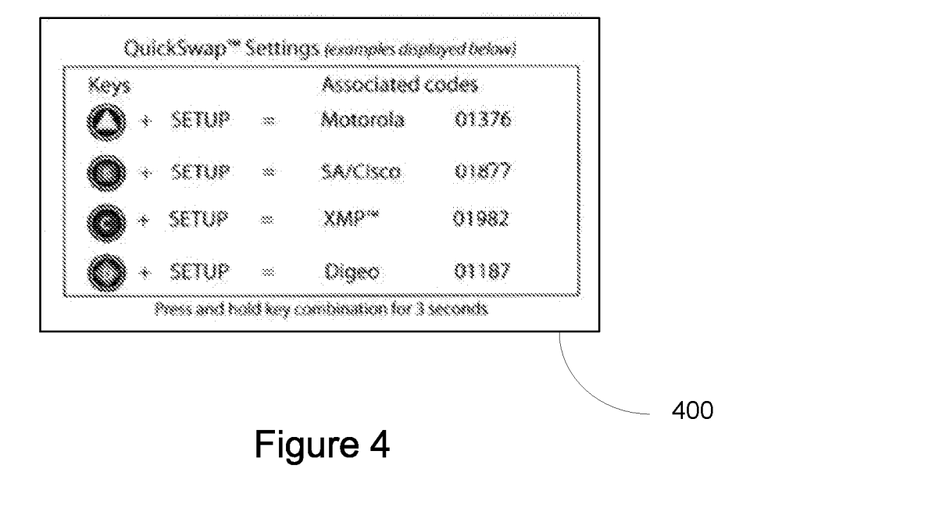
FIG. 4 illustrates an exemplary instruction card for use with an embodiment of the invention.
Figure 5:
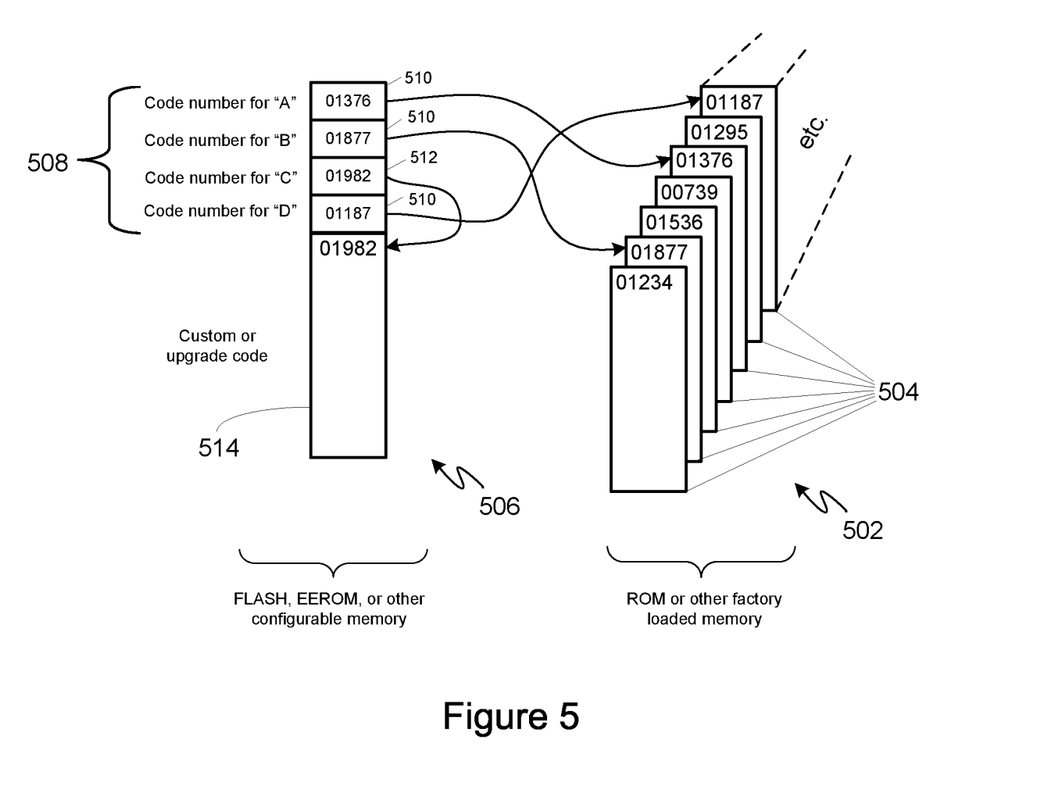
FIG. 5 illustrates in symbolic form an exemplary memory configuration which may be used in conjunction with an embodiment of the invention.

By way of more detailed example, FIG. 4 illustrates a quick setup instruction card 400 such as might be provided to installers for a cable system operator. This card advises the cable system STB installer to hold down the "A" key 302 together with the "Setup" key 310 for three seconds in order to configure controlling device 100 to command the operation of a Motorola STB (numeric setup code 01376). Using the "B" key instead will result in configuration for a Scientific Atlanta/Cisco STB (numeric setup code 01877), using the "C" key will result in configuration for an STB which uses the XMP IR protocol (numeric setup code 01982), and so on. Referring now to FIG. 5, the contents of those portions of an exemplary controlling device memory which may be used in support of this feature are illustrated in symbolic form. As is well known in the art, a portion 502 of non-configurable memory such as ROM, OTP, FLASH, etc. (e.g. a portion of memory 204 of FIG. 2) may be programmed at time of manufacture with a library of multiple appliance command data sets 504. As is also well known, each command data set may be identifiable via a unique numeric set up code and controlling device 100 may be configured to operate any of those appliances by direct entry of the appropriate numeric set up code, for example as described in the ATLAS OCAP 5-Device Remote Control User Guide, Universal Electronics Inc. document M1056 Rev 3.0 ©2006, which is hereby incorporated in its entirety herein.

Additionally, in accordance with the instant invention, in an exemplary embodiment a portion 506 of configurable memory such as EEPROM, FLASH, etc. (e.g. a portion of memory 206 of FIG. 2) may contain a table 508 of numeric set up codes 510, 512 comprising the available quick set up links assigned to the four buttons 302 through 308. The contents of table 508 may for example comprise numeric set up codes 510 which correspond to command data sets 504 stored in non-configurable memory, and/or numeric set up codes 512 which correspond to customized or upgraded command data sets 514 which are themselves stored in configurable memory.

It should be appreciated that in the above example, the specific selection and ordering of STB devices to be assigned to the available quick set up keys may be unique to a particular cable system operator, and accordingly different configurable memory contents and different instruction cards may be provisioned for each cable system operator, or even for different regions within the same cable system operation.

Figure 6:
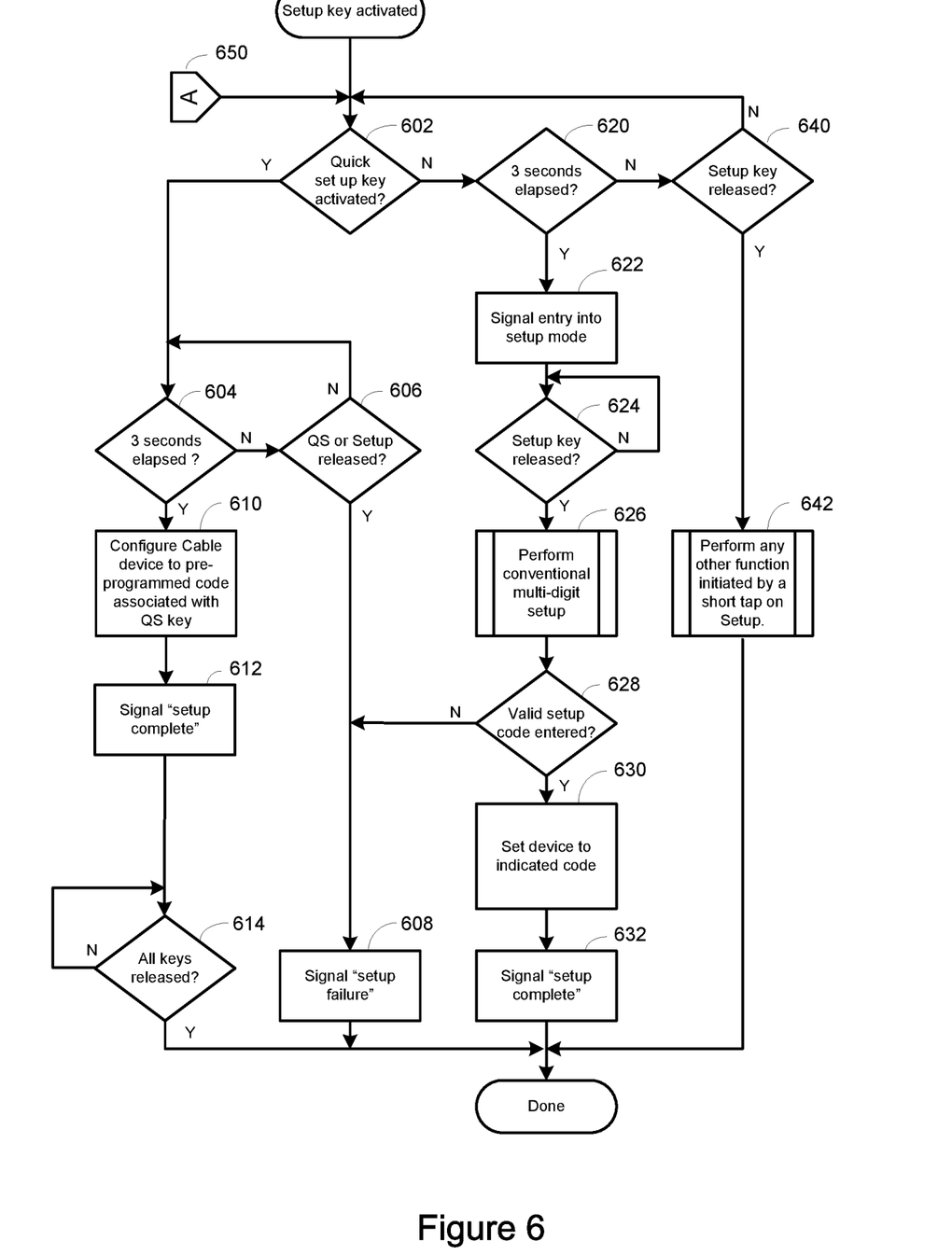
FIG. 6 illustrates in flow chart form an exemplary method for rapid set up of a universal controlling device.

Turning now to FIG. 6, the steps performed by an exemplary implementation of the inventive feature are presented in flowchart form. In reviewing this and other flowcharts of the instant disclosure, it will be appreciated that certain common elements well known in the art such as, for example, stuck key timeouts, low battery detection, etc. have been omitted for the sake of clarity, and also that the use of the term "step" herein is not intended to imply a required order to carry out the actions described and that the designated numbers are for convenience of reference only. When Setup key 310 of an exemplary controlling device 100 is activated, at step 602 the operating program of controlling device 100 first checks if one of the quick set up keys 302, 304, 306 or 308 is also activated. If so, at steps 604 and 606, the operating program waits to ensure that both keys remain continuously activated for a specified time, for example three seconds in accordance with the directions of instruction card 400. If not, at step 608 the operating program signals an error condition (e.g., via user feedback device 202) and exits without altering the current configuration setting of controlling device 100. Once the two keys have been continuously activated for the required period of time, at step 610 the operating program retrieves a numeric set up code value from the table 508 entry which corresponds to the activated quick set up key and uses that value to configure controlling device 100 to use the command data set corresponding to the indicated numeric set up code value, in this example, to control functional operations of the STB. Thereafter, at step 612 the operating program signals a successful set up completion to the user (e.g., via user feedback device 202), waits at step 614 for all keys to be released, and terminates the set up procedure. In this example, it will be understood that the STB device mode need not be specified to the remote control as the remote control will recognize that activation of a quick set up key is only being used to configure the STB device mode. This would also be true for alternative embodiments in which the command data set library of a controlling device supports only a single type of appliance, such as for example a remote control intended only for use with a cable STB, a remote control supplied by the manufacturer of a particular TV model which supports only that TV but includes a library of cable STB devices, etc. If, however, the quick set up keys are to be made available for quickly setting up multiple device types, e.g., the command code data sets for the most commonly purchased televisions are also mapped to the quick set up keys, the remote control will need to be informed of the device mode to be set up via activation of the quick set up key. To this end, a device mode key of the exemplary remote control of FIG. 3 may be activated prior to the simultaneous activation of the Setup key and quick setup key or thereafter.

Returning to step 602, if it is determined that a quick set up key is not active, at step 620 the operating program checks if three seconds has elapsed since Setup key 310 was activated. If so (i.e., key 310 has been held down for 3 seconds) at step 622 the operating program signals (e.g., via user feedback device 202) that it is ready to accept conventional set up input (e.g., entry of a multi-digit numeric code). Once the Setup key is released, a conventional numeric code set up entry such as, for example, that described in the before referenced ATLAS OCAP 5-Device Remote Control User Guide may be performed at step 626. Upon completion of the numeric entry, if a valid code has been entered, at step 630 the operating program configures the indicated device mode of controlling device 100, signals a successful set up (e.g., via user feedback device 202) at step 616, and terminates the set up procedure. In the case of controlling devices adapted to offer multiple device modes supporting different appliance types, such as the exemplary embodiment of FIG. 3, the indicated device mode, in this example, may be the current device mode of the remote control or a device mode specified to the remote control by activation of a device mode key either prior to or after completion of the numeric entry. Alternatively, one of the numeric digits entered may be indicative of the device mode to be configured; numeric codes may be assigned to ranges representative of different appliance types, etc.

Returning to step 620, if three seconds have not yet elapsed, the operating software of controlling device 100 at step 640 determines if the Setup key 310 is still activated. If so the operating program repeats the series of tests starting at step 602. If not (i.e., Setup button 310 has been released before three seconds has elapsed and without any simultaneous activation of one of the quick set up buttons) at step 642 the operating software performs any other action which may have been defined to be initiated by a short activation of Setup key 310, by way of example, a function synthesis input as described in the before referenced U.S. Pat. No. 5,515,052.

It will be appreciated that in certain embodiments, it may be desirable to protect against inadvertent activation of the quick set up method by a consumer during their normal use of controlling device 100. To this end the quick set up feature may, for example, only be activatable for a specified period of time after batteries have been inserted into controlling device 100. Alternatively, means such as a jumper, special keystroke sequence, etc., may be provided to allow a cable system STB installer to lock all or part of the controlling device configuration once the quick set up has been successfully performed.

Figure 7:
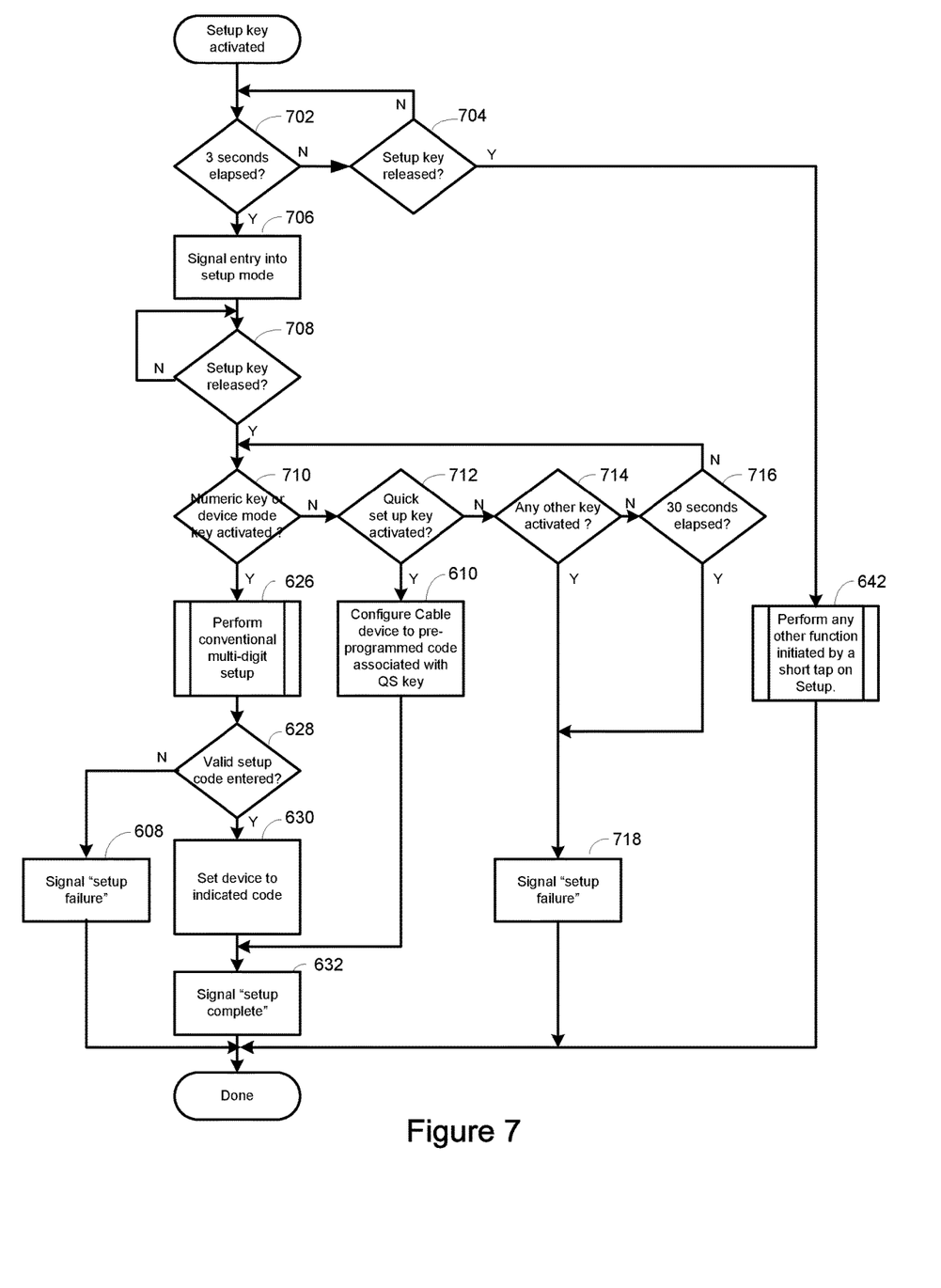
FIG. 7 illustrates in flow chart form a further exemplary method for rapid set up of a universal controlling device.

Turning now to FIG. 7, there is presented an alternative method for implementing entry into the quick set up mode. Unlike the method of FIG. 6 in which the Setup key and one of the quick set up keys are activated simultaneously, in the method of FIG. 7 the Setup key activated alone for three seconds, as in the conventional set up method described for example in the before referenced ATLAS OCAP 5-Device Remote Control User Guide. However, once the three second time has been confirmed and the operating program commences the set up process, the next key activated may determine the set up method being used. If the next key activated is one of the numeric keys 312 or possibly a device mode key in those embodiments in which multiple device modes are supported, a conventional set up is initiated; but if the next key activated is one of the quick set up keys 302 through 308, a quick set up is performed. With reference to FIG. 7, steps 702 through 708 time the initial activation of Setup key 310 and initiate the set up process (it being noted that activation of the Setup key for less than three seconds has the same effect as previously described in conjunction with FIG. 6 step 642). Once the set up mode has been initiated, steps 710 and 712 test for activation of a numeric key/device mode key or a quick set up key respectively. Activation of any other key (step 714) or no further activity within 30 seconds (step 716) constitute error conditions and will cause the operating program to terminate the set up process after signaling a failure to the user at step 718. However, if activation of a numeric key is detected at step 710, a conventional multi-digit set up is initiated as previously described in conjunction with FIG. 6, while if activation of a quick setup key is detected at 712, a quick set up is performed, also as previously described in conjunction with FIG. 6.

Figure 8:
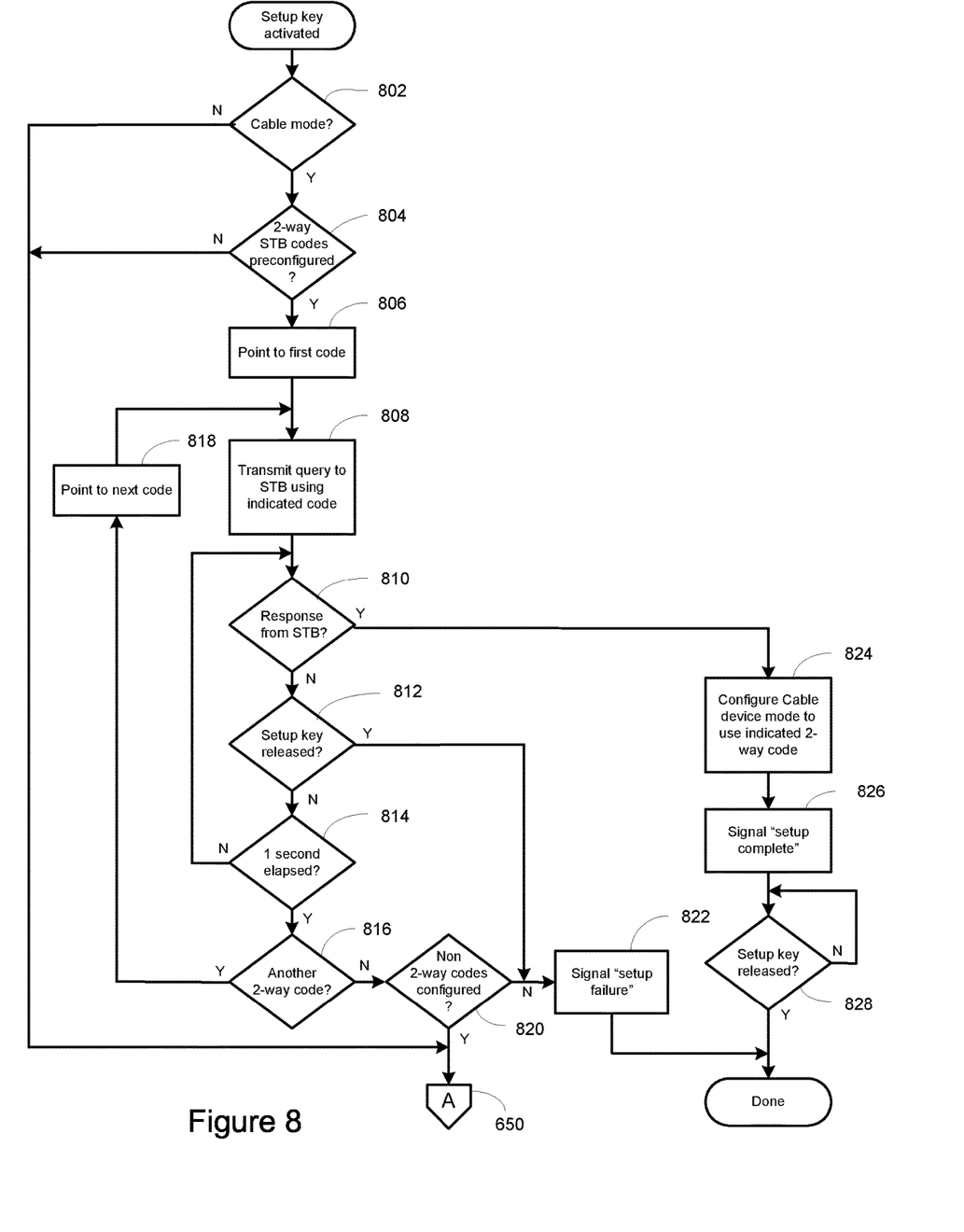
FIG. 8 illustrates in flow chart form a yet further exemplary method for rapid set up of a universal controlling device.

Turning now to FIG. 8, a third alternative method is presented, which method may be used in embodiments where one or more of the selected quick set up command data sets corresponds to a bi-directional STB protocol, i.e., a two-way protocol which permits controlling device 100 to both transmit to and receive from a STB. In such cases, it may be possible for controlling device 100 to issue a response-eliciting command or enquiry using the specified protocol(s) in order to automatically detect the presence of a compatible STB and configure itself accordingly. Once again utilizing a universal controlling device 100 is intended for deployment by a cable system operator in conjunction with a cable STB as an exemplary embodiment, when setup key 310 is activated, at step 802 the operating program of controlling device 100 first checks if the controlling device is currently set to the "cable" operational mode (e.g., by prior activation of the "Cable" mode button 314). If not, the operating software proceeds as previously described, continuing for example at step 650 of FIG. 6. If, however, the "cable" mode is currently active, at step 804 the operating software next determines if any of the predetermined quick set up numeric codes (e.g., those contained in table 508) correspond to a bidirectional STB communication protocol. If not, the set up process continues at step 650 as before. If however any bidirectional protocol(s) are designated, at step 806 the operating software sets a pointer to the first such code and then at step 808 transmits a response-eliciting query using the indicated command data set. The operating software may then wait for a predetermined period of time (e.g., one second, as at step 814) for a response to that transmission. If the set up key is released during this period as determined by step 812, this constitutes an error condition and the operating software signals a set up failure at step 822 and the set up process terminated with no changes to the controlling device configuration. If a valid response is received from an STB as determined at step 810, at step 824 the cable device mode of the universal controlling device 100 is configured to use the indicated command data set, and the set up process is completed by signaling a successful set up at step 826 and terminating the process after the set up key is released at step 828. If no STB response is received within the allotted time period, at step 816 the operating software determines if any further bidirectional protocols are designated. If so, at step 818 the pointer is set to the next such code and the query/response sequence repeated. If not, at step 820 the operating software next determines if any numeric codes corresponding to non-bidirectional protocols are designated for quick set up. If so, the set up process continues as before, for example at step 650 of FIG. 6. If no such codes are present, the set up process is terminated with no change to the configuration of controlling device 100.

In certain embodiments, the expected response from a bidirectionally-equipped STB may be a simple acknowledgement of the controlling device transmission. In other embodiments, the response may constitute additional configuration data for use by controlling device 100. By way of example, without limitation, controlling device 100 may include buttons intended to provide immediate access to a video-on-demand "barker" channel 316 or to a user's favorite channel(s) 318, for example ESPN, CNN, etc. Since these content streams may be mapped to different channel numbers in different regions of a cable service provider's territory, part of the STB response to an initial query may comprise data (extracted, for example, from an on-board program guide) for use by the operating software of controlling device 100 in configuring channel tuning macro sequences for those keys. Alternatively, such configuration data may be provided by the STB as a part of a separate transaction, distinct from the initial set up related confirmation.

In a yet further exemplary embodiment, the quick set up keys of the instant invention, rather than being mapped directly to a specific command data set, may be mapped to an entry in a brand table such as described in U.S. Pat. No. 5,614,906, of like assignee and incorporated herein by reference in its entirety, which brand table in turn may identify a plurality of command data sets attributable to a specific brand of device. In accordance with the teachings of U.S. Pat. No. 5,614,906, upon identification of a particular brand to be set up by activation of a quick set up key, the operating program of controlling device 100 may cause an effects observable command from each of the plurality of command data sets mapped to the selected quick set up key to be assigned to each of a group of user actuatable keys for example, without limitation, digit keys 312, thereby enabling a user to test each of the command data sets and identify the one which operates their equipment. Alternatively, repetitive actuation of a single key may be used to sequentially step through the plurality of command data sets, as described for example in before referenced U.S. Pat. No. 4,959,810 or in U.S. Pat. No. 4,703,359, both incorporated herein by reference in their entirety. The quick set up keys of the controlling device of this embodiment may thus for example be mapped at time of deployment to the command data sets of those brands which enjoy the greatest popularity in the destination market based on, for example, geography, intended use, equipment the controlling device will be packaged with, etc.

Similarly, the quick set up keys may be mapped to an entry in a device type table, e.g., TV, DVD player, etc., which device type table in turn may identify a plurality of command data sets attributable to a specific type of device. Again, in accordance with the teachings of U.S. Pat. No. 5,614,906, upon identification of a particular device type to be set up by activation of a quick set up key, the operating program of controlling device 100 may cause an effects observable command from each of the plurality of command data sets mapped to the selected quick set up key to be assigned to each of a group of user actuatable keys for example, without limitation, digit keys 312, thereby enabling a user to test each of the command data sets and identify the one which operates their equipment. Repetitive actuation of a single key may also be used to sequentially step through the plurality of command data sets, as described for example in before referenced U.S. Pat. No. 4,959,810 or in U.S. Pat. No. 4,703,359, both incorporated herein by reference in their entirety. The quick set up keys of the controlling device of this embodiment may thus for example be mapped at time of deployment to those command data sets within a particular device type which enjoy the greatest popularity in the destination market based on, for example, geography, intended use, equipment the controlling device will be packaged with, etc.

Figure 9:
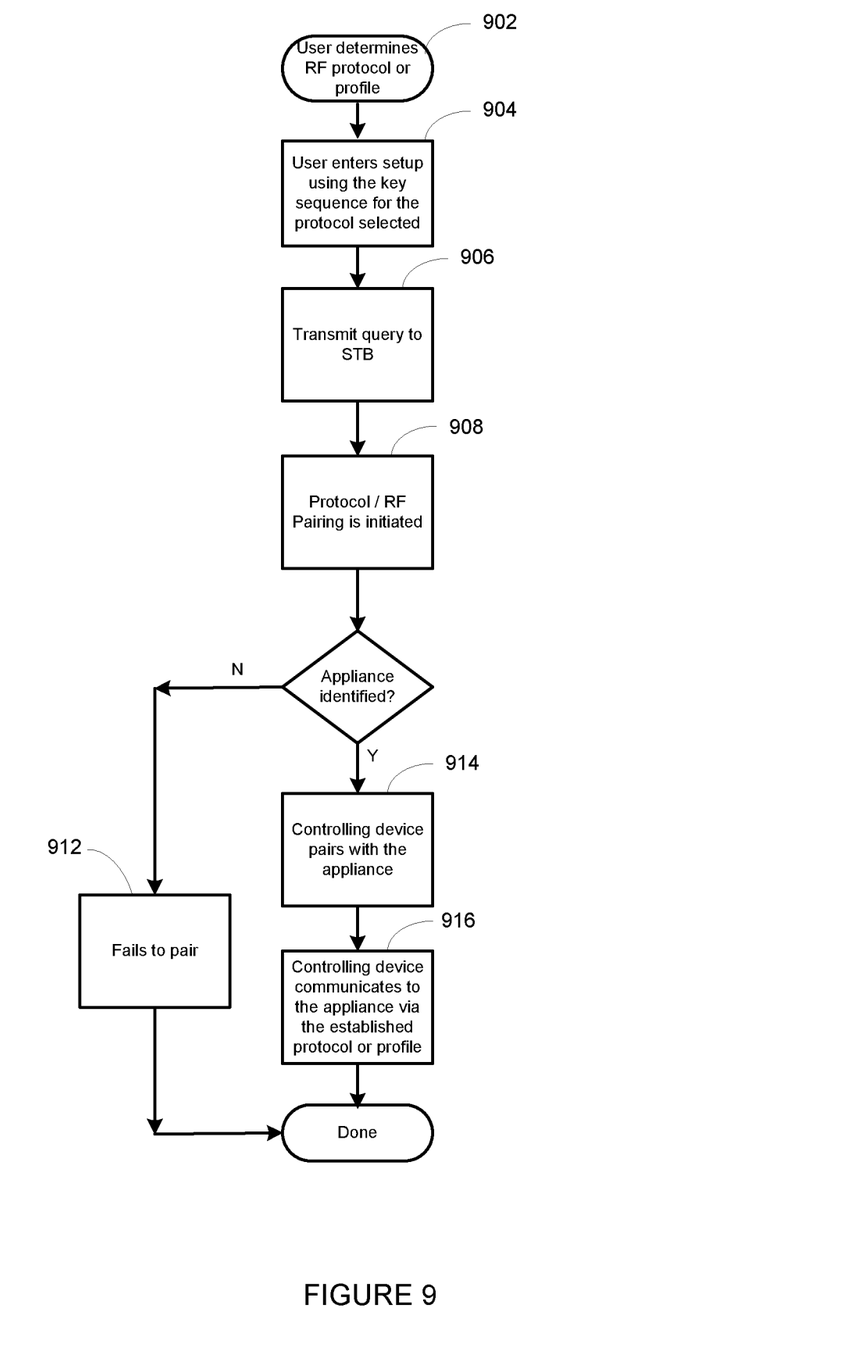
FIG. 9 illustrates in flow chart form a still further exemplary method for rapid set up of a universal controlling device.

In instances where the controlling device 100 and the appliance to be controlled, e.g., STB 104, are intended to bi-directionally communicate via use of a one of a plurality of possible RF communication protocols each of which is capable of being supported by the controlling device 100, i.e., the controlling device 100 has stored in memory processor executable instructions for supporting a plurality of RF communication protocols, a further configuration method as illustrated in FIG. 9 may be utilized. In the illustrated, exemplary method shown in FIG. 9 the quick setup input elements, e.g., keys 302, 304, 306, and 308, are each linked to a one of the plurality of RF communication protocols that the controlling device 100 may use to exchange communications with an intended target appliance. Accordingly, to specify to the controlling device 100 which one of the plurality of RF communication protocols to use when communicating with an intended target appliance, a user may consult 902 a quick setup instruction card or the like type of reference as previously described wherein the reference/instructions will indicate which predetermined input elements of the controlling device 100 have been linked to which appliances (e.g., which brand and/or model of appliance is linked to each input element) and, accordingly, to which one of the plurality of RF communication protocols supported by the controlling device 100 that will support communication exchanges with that appliance. In this manner, when a user places the controlling device 100 into a setup mode 904 and activates the desired one of the quick setup elements (using any appropriate setup initiating procedure/key entry sequence as described above), the controlling device 100 will use the one of the plurality of RF communication protocols that was linked to the activated one of the quick setup elements to transmit a query communication 906 to the intended target appliance for the purpose of attempting to pair 908 the controlling device 100 with that intended target appliance. In the event that the query communication causes a response to be successfully sent from the intended target appliance to the controlling device 100 the controlling device 100 will be paired 914 with the intended target appliance and the controlling device 100 will thereafter use the corresponding RF protocol 916 when communicating with the intended target appliance, e.g., when transmitting a command communication in response to an activation of a command input element of the controlling device 100. In the event that the query communication does not cause a response to be successfully sent from the intended target appliance to the controlling device 100, the controlling device 100 will not be paired 912 with the intended target appliance and alternative methods for attempting to pair the controlling device 100 with the intended target appliance may be utilized, e.g., the user may try another quick setup input element, be instructed to step through and try different one of the plurality of RF communication protocols supported by the controlling device 100, or the like. As before, the quick setup input elements as used in connection with the setup method illustrated in FIG. 9 could be dedicated for use in connection with configuring the controlling device 100 to use a one of a plurality of RF communication protocols for only one type of intended target device (e.g., a STB) or the quick setup input elements could be used in connection with configuring the controlling device 100 to use a one of a plurality of RF communication protocols for plural types of intended target devices. In the latter case, the user may be required to first indicate the device type (for example via activation of a device mode key) that is to be configured via use of the quick setup input elements as described previously. The linking of the quick setup elements to respective ones of the plurality of RF protocols supported by the universal controlling device may likewise be done in any of the manners described previously, e.g., at time of manufacture, prior to deployment of the universal controlling device 100, etc.

While various concepts have been described in detail, it will be appreciated by those skilled in the art that various modifications and alternatives to those concepts could be developed in light of the overall teachings of the disclosure. For example, while one disclosed exemplary embodiment contemplates setup of a controlling device intended for use with a cable STB, it will be appreciated that the inventive methods described may be equally useful in other contexts, for example, a universal controlling device supplied together with a particular manufacturer's appliance, e.g. an AV receiver, may be adapted to support quick set up configuration of other device types (e.g. DVD player, TV, etc.) of the same manufacture. In will also be appreciated that the method described herein can be used to configure the controlling device such that it will use RF communications when communicating with one or more various types of devices while using IR communications when communicating with one or more various other types of devices. Further, while various aspects of this invention have been described in the context of functional modules and illustrated using block diagram or flow chart format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for configuring a universal controlling device to transmit communications to an intended target device via a communications channel, comprising:
   in direct response to receiving into the universal controlling device while in a setup mode of operation of the universal controlling device a selection of a one of a plurality of quick setup input elements of the universal controlling device causing the universal controlling device to repeatedly transmit a response-eliciting query, each time using a different one of a plurality of command sets linked to the one of the plurality of quick setup input elements, and, when a response to a transmitted response-eliciting query is received by the universal controlling device from the intended target device, causing the universal controlling device to exit the setup mode of operation of the universal controlling device whereupon the universal controlling device will have configured itself to use the one of the plurality of command sets that was used to transmit the response-eliciting query that was responded to by the intended target device when the universal controlling device is subsequently operated in an operating mode of the universal controlling device in which the universal controlling device is intended to transmit communications to the intended target device.

2. The method as recited in claim 1, wherein each of the plurality of command sets are used to communicate with a same type of target device.

3. The method as recited in claim 1, wherein each of the plurality of command sets are used to communicate with a same brand of target device.

4. The method as recited in claim 1, wherein the response to the transmitted response-eliciting query comprises data for configuring configurable keys of the universal controlling device to access one or more video-on-demand channels available via use of the intended target device.

5. The method as recited in claim 4, wherein the intended target device comprises a set-top box.

6. The method as recited in claim 4, wherein the intended target device comprises a television.

7. The method as recited in claim 4, wherein the intended target device comprises a media streaming device.

8. The method as recited in claim 1, comprising receiving into the universal controlling device while in the setup mode of operation of the universal controlling device data indicative of a device type of the intended target device and using by the universal controlling device the device type to link the plurality of command sets to the one of the plurality of quick setup input element.

9. The method as recited in claim 1, comprising causing the universal controlling device to enter into the setup mode of operation of the universal controlling device in response to an activation of a setup input element of the universal controlling device.

10. The method as recited in claim 1, comprising causing the universal controlling device to enter into the setup mode of operation of the universal controlling device in response to an activation of a setup input element of the universal controlling device for a predetermined period of time.

11. The method as recited in claim 1, comprising causing the universal controlling device to enter into the setup mode of operation of the universal controlling device in response to a simultaneous activation of a setup input element of the universal controlling device and a one of the quick setup input elements.

12. The method as recited in claim 1, comprising causing the universal controlling device to enter into the setup mode of operation of the universal controlling device in response to a simultaneous activation of a setup input element of the universal controlling device and a one of the quick setup input elements for a predetermined period of time.

13. A universal controlling device for use in transmitting communications to an intended target device, comprising:
at least one communications circuit;
at least one processing unit in communication with the at least one communications circuit;
a key matrix having a plurality of quick setup input elements; and
a memory storing instructions executable by the processing unit wherein the instructions, when executed by the processing unit, cause the universal controlling device to respond to receiving into the universal controlling device while in a setup mode of operation of the universal controlling device a selection of a one of the plurality of quick setup input elements of the universal controlling device by causing the universal controlling device to repeatedly transmit, via use of the at least one communication circuit, a response-eliciting query, each time using a different one of a plurality of command sets linked to the one of the plurality of quick setup input elements, and, when a response to a transmitted response-eliciting query is received by the universal controlling device, via use of the at least one communication circuit, from the intended target device, causing the universal controlling device to exit the setup mode of operation of the universal controlling device whereupon the universal controlling device will have configured itself to use the one of the plurality of command sets that was used to transmit the response-eliciting query that was responded to by the intended target device when the universal controlling device is subsequently operated in an operating mode of the universal controlling device in which the universal controlling device is intended to transmit communications to the intended target device.

14. The universal controlling device as recited in claim 13, wherein each of the plurality of command sets are used to communicate with a same type of target device.

15. The universal controlling device as recited in claim 13, wherein each of the plurality of command sets are used to communicate with a same brand of target device.

16. The universal controlling device as recited in claim 13, wherein the response to the transmitted response-eliciting query comprises data for configuring configurable keys of the universal controlling device to access one or more video-on-demand channels available via use of the intended target device.

17. The universal controlling device as recited in claim 16, wherein the intended target device comprises a set-top box.

18. The universal controlling device as recited in claim 16, wherein the intended target device comprises a television.

19. The universal controlling device as recited in claim 16, wherein the intended target device comprises a media streaming device.

20. The universal controlling device as recited in claim 13, comprising receiving into the universal controlling device while in the setup mode of operation of the universal controlling device data indicative of a device type of the intended target device and using by the universal controlling device the device type to link the plurality of command sets to the one of the plurality of quick setup input element.

21. The universal controlling device as recited in claim 13, comprising causing the universal controlling device to enter into the setup mode of operation of the universal controlling device in response to an activation of a setup input element of the universal controlling device.

22. The universal controlling device as recited in claim 13, comprising causing the universal controlling device to enter into the setup mode of operation of the universal controlling device in response to an activation of a setup input element of the universal controlling device for a predetermined period of time.

23. The universal controlling device as recited in claim 13, comprising causing the universal controlling device to enter into the setup mode of operation of the universal controlling device in response to a simultaneous activation of a setup input element of the universal controlling device and a one of the quick setup input elements.

24. The universal controlling device as recited in claim 13, comprising causing the universal controlling device to enter into the setup mode of operation of the universal controlling device in response to a simultaneous activation of a setup input element of the universal controlling device and a one of the quick setup input elements for a predetermined period of time.

* * * * *